United States Patent
Sallmann et al.

[15] 3,691,191
[45] Sept. 12, 1972

[54] TETRAZOLE DERIVATIVES

[72] Inventors: Alfred Sallmann, Bottmingen; Rudolf Pfister, Basel, both of Switzerland

[73] Assignee: Ciba-Geigy Corporation, Ardsley, N.Y.

[22] Filed: July 16, 1969

[21] Appl. No.: 842,355

[30] Foreign Application Priority Data

July 18, 1968 Switzerland ............. 10792/68

[52] U.S. Cl. ....260/308 D, 260/247.5 R, 260/293.69, 260/465 D, 260/465 E, 260/471 R, 260/518 R, 260/518 A, 260/562 P, 260/571, 260/576, 424/59, 424/269

[51] Int. Cl. .............................................C07d 55/56

[58] Field of Search..................................260/308 D

[56] References Cited

UNITED STATES PATENTS

| | | | |
|---|---|---|---|
| 3,138,636 | 6/1964 | Scherrer | 260/518 |
| 3,294,813 | 12/1966 | Juby | 260/308 |
| 3,161,654 | 12/1964 | Shen | 260/326.12 |
| 3,417,096 | 12/1968 | Juby | 260/308 |
| 3,531,493 | 9/1970 | Gittos et al. | 260/308 |

FOREIGN PATENTS OR APPLICATIONS

| | | | |
|---|---|---|---|
| 679,315 | 10/1966 | Belgium | 260/308 |

OTHER PUBLICATIONS

Siegmund et al., Proc. Soc. Exptl. Biol. Med., Vol. 95, pp. 729– 731 (1957).

Herbst, " Tetrazoles as Carboxylic Acid Analogs," in Graff, Essays in Biochemistry, (New York, 1956), pp. 153– 155.

*Primary Examiner*—Alton D. Rollins
*Attorney*—Karl F. Jorda and Bruce M. Collins

[57] ABSTRACT

The compounds are of the class of substituted 5-(o-anilino-benzyl)-tetrazoles and the salts thereof with bases and have anti-inflammatory, analgesic and antipyretic activity; they absorb irritating rays of ultra-violet light; they are active ingredients of compositions and are useful for treating inflammatory diseases, alleviating pain and protecting skin against irritating ultra-violet light; an illustrative embodiment is 5-[o-(2,6-dichloro-anilino)-benzyl]-tetrazole.

9 Claims, No Drawings

TETRAZOLE DERIVATIVES

DETAILED DISCLOSURE

The present invention concerns substituted 5-(o-anilino-benzyl)-tetrazoles and salts thereof with bases, compositions containing them, and methods of treating inflammatory diseases, alleviating pain and protecting skin against irritating ultra-violet light comprising administering them.

More in particular, the present invention concerns compounds of the formula

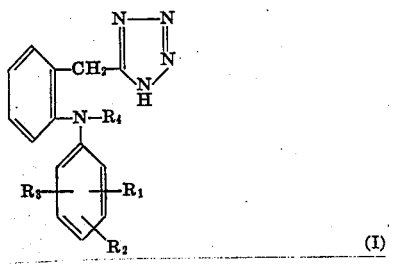

wherein
$R_1$ and $R_3$, independently of each other, are hydrogen, methyl, ethyl or halogen up to the atomic number 35;
$R_2$ is hydrogen, methyl, ethyl, trifluoromethyl or halogen up to the atomic number 35; and
$R_4$ is hydrogen, methyl, ethyl, n-propyl or n-butyl;
and the pharmaceutically acceptable salts thereof with bases.

A preferred subclass of compounds according to the invention are the tetrazole derivatives of formula I, wherein
$R_1$ is in 2-position and is hydrogen, methyl or chloro;
$R_2$ is in 3-position and is hydrogen, methyl, trifluoromethyl or chloro;
$R_3$ is in 6-position and is hydrogen or chloro,
$R_4$ is hydrogen, methyl or ethyl;
and the pharmaceutically acceptable salts thereof with bases.

Preferred members of this subclass are
5-[o-(3-chloro-o-toluidino)-benzyl]-tetrazole,
5-[o-(N-ethyl-3-chloro-o-toluidino)-benzyl]-tetrazole,
5-[o-($\alpha$, $\alpha$, $\alpha$-trifluoro-m-toluidino)-benzyl]-tetrazole,
5-[o-(N-methyl-$\alpha$, $\alpha$, $\alpha$-trifluoro-m-toluidino)-benzyl]-tetrazole,
5[o-(N-ethyl-$\alpha$, $\alpha$, $\alpha$-trifluoro-m-toluidino)-benzyl]-tetrazole,
5-[o-(2,3-xylidino)-benzyl]-tetrazole,
5-[o-(2,6-dichloro-anilino)-benzyl]-tetrazole,
and the pharmaceutically acceptable salts thereof with bases.

Other objects of the invention are compositions comprising a compound as defined under formula I or a pharmaceutically acceptable salt thereof with a base pharmaceutically acceptable salt thereof with a base and an inert carrier therefor, methods of treating inflammatory diseases and alleviating pain in a mammal, comprising administering to a mammal suffering therefrom an effective amount of a compound as defined under formula I as well as the method of protecting the skin of a mammal against irritating rays of ultra-violet light comprising applying to said skin a compound as defined under formula I or a pharmaceutically acceptable salt thereof with a base.

In the tetrazole derivatives of formula I and the corresponding starting materials mentioned further below, $R_1$, $R_2$ or $R_3$ is as halogen, chloro, fluoro or bromo.

The new tetrazole derivatives of formula I and their salts are produced by reacting an optionally substituted 2-(o-anilinophenyl)-acetonitrile of the formula II

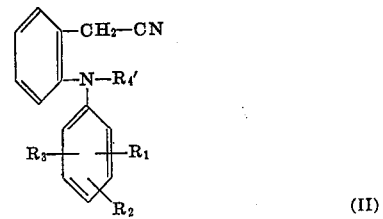

wherein
$R_4'$ is hydrogen, methyl, ethyl, n-propyl or n-butyl, or an alkanoyl group having at most four carbon atoms, and $R_1$, $R_2$ and $R_3$ have the meaning given under formula I with at least the molar amount of hydrazoic acid or of an azide, hydrolysing an obtained tetrazole derivative, wherein $R_4'$ denotes a lower alkanoyl group, to split off this group and/or, optionally, converting an obtained tetrazole derivative of formula I into a salt with an inorganic organic base, or liberating the tetrazole derivative of formula I from an initially obtained salt.

The reaction of the nitriles of formula II with azides or hydrazoic acid is performed between room temperature and the boiling temperature of the applied solvents stated below, e.g. between 60° and 200° and preferably between 60° and 160° C. As azides, inorganic azides such as sodium azide, lithium azide, aluminum azide or ammonium azide, or organic azides such as trimethyl ammonium azide, aniline hydroazide, piperidinium azide and morpholinium azide may be used. Reactions which can be performed simply and with good yields are reactions with ammonium azide, aluminum azide and organic azides, if these azides are produced in situ from sodium azide and ammonium chloride or aluminum chloride or hydrochlorides of organic bases such as trimethylamine, piperidine, morpholine and aniline hydrochloride. The reaction is carried out, for example, in a suitable, preferably anhydrous organic solvent, especially in dimethyl formamide or dimethyl sulfoxide or also in hexamethylphosphoric acid triamide, diethyleneglycol monomethyl ether and monoethyl ether, tetrahydrofuran or n-butanol. Optionally, the reaction can be accelerated by the addition of catalysts, e.g. lithium chloride or Lewis acids, such as boron trifluoride etherate.

The hydrolytic splitting off of a lower alkanoyl group $R_4'$ is preferably performed by reacting an inorganic, basic substance, e.g. an alkali hydroxide, alkali carbonate or alkali bicarbonate, with a corresponding intermediate product containing, as group $R_4'$, a lower alkanoyl group, especially the formyl or the acetyl group. For example, the stated intermediate product is heated in an aqueous, aqueous/organic or organic alkali hydroxide solution, e.g. in a methanolic or ethanolic alkali hydroxide solution.

Certain starting materials of formula II are described in the Belgian Pat. No. 679,315 and others can be produced analogously to the processes given in this patent. They are produced, for example, from substituted N-phenyl-anthranilic acids, an appreciable number of which are known. These are firstly converted into their lower alkyl esters, e.g. the methyl esters, and then, optionally, alkylated at the amino group by reaction with a straight-chain, lower alkyl halide in the presence of an alkaline condensation agent, such as sodium hydride. N-alkyl-N-phenylanthranilic acid alkyl esters, substituted according to definition, can also be produced in one stage from the corresponding N-phenylanthranilic acids by reaction of the bis-alkali metal compounds, produced in situ, e.g. with the aid of sodium hydride, with reactive esters of straight-chain, lower alkanols such as, e.g. methyl or ethyl iodide. The corresponding o-anilinobenzyl alcohols are obtained by reduction of the — optionally N-alkylated — lower alkyl esters of N-phenylanthranilic acids with complex hydrides such as, e.g. lithium aluminum hydride or lithium boron hydride. The o-anilino-benzyl alcohols with a non-alkylated amino group are converted by heating with acetyl chloride, either into the corresponding N-acetyl-$\alpha$-N-phenyl-o-toluidines or by reacting with ethereal hydrochloric acid into the corresponding $\alpha$-chloro-N-phenyl-o-toluidines. The latter compounds are also obtained by reaction of the corresponding o-anilinobenzyl alcohols with thionyl chloride in the presence of pyridine. The N-alkylated o-anilinobenzyl alcohols are preferably converted with phosphorus tribromide into the corresponding N-alkyl-$\alpha$-bromo-N-phenyl-o-toluidines or with thionyl chloride, in the presence of pyridine, into the corresponding N-alkyl-$\alpha$-chloro-N-phenyl-o-toluidines. Finally, all the aforementioned $\alpha$-halogeno-N-phenyl-o-toluidines or $\alpha$-halogeno-N-alkyl-N-phenyl-o-toluidines can be reacted with sodium or potassium cyanide, e.g. in dimethyl sulfoxide, to give the desired (o-anilinophenyl)-acetonitriles of formula II.

According to a second process, compounds falling under the more specific formula Ia

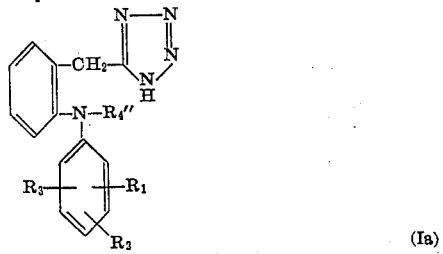

(Ia)

wherein
$R_4''$ is the methyl, ethyl, n-propyl or n-butyl group, and $R_1$, $R_2$ and $R_3$ have the meanings given under formula I,
are prepared by converting a compound of the formula Ib

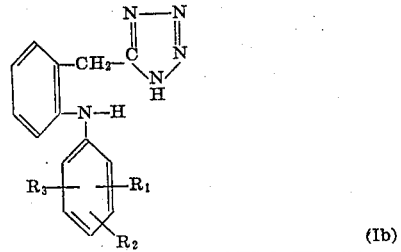

(Ib)

wherein
$R_1$, $R_2$ and $R_3$ have the meaning given under the formula I, in a suitable solvent, such as dimethyl formamide, with twice the molar amount of sodium hydride into its disodium salt, reacting the latter with an alkyl halide of the formula III

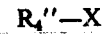

$R_4''-X$         (III)

wherein $R_4''$ has the meaning given under formula Ia and X is chlorine, bromine or iodine,
and liberating from the initially resulting salt the tetrazole derivative of formula Ia, and optionally converting the latter into a salt with an inorganic or organic base. Tetrazole derivatives of formula I, if prepared according to the invention, are usually obtained in form of solutions. However, depending on the type of azide, and the solvent used, it may be that the salt of the tetrazole, corresponding to the azide used, precipitates which then can be separated as such.

The tetrazole derivatives of formula I are liberated from their salts in conventional manner, e.g. by addition of the corresponding amount of mineral acid. On the other hand, the tetrazole derivatives of formula I are optionally converted, likewise in conventional manner, into their salts with inorganic and organic bases.

As optionally produceable salts of tetrazole derivatives of formula I, mention is made of e.g. the sodium, potassium, lithium, magnesium, calcium and ammonia salts, as well as salts with ethylamine, triethylamine, 2-aminoethanol, 2,2'-iminodieithanol, 2-dimethylaminoethanol, 2-diethylaminoethanol, ethylenediamine, benzylamine, p-aminobenzoic acid-2-diethylaminoethyl ester (procaine), pyrrolidine, piperidine, morpholine, 1-ethyl-piperidine or 2-piperidinoethanol or with basic ion exchangers.

It has been found that the compounds of Formula I and the pharmaceutically acceptable salts thereof have valuable pharmacological properties. In particular, they have been found to have anti-inflammatory, analgesic and antipyretic activity combined with a favorable therapeutic index. This activity is determined in various pharmacological tests, for example in the Bolus alba test in rats, the UV-erythema test in guinea pigs [cp. G. Wilhelmi, Schweiz. Med. Wochenschrift 79, 577 (1949)] the cotton pellet test in rats and the phenylquinone stretch test in mice [cp. E. Siegmund et al. Proc.Soc. Exp. Biol. Med. 95, 729 (1957)]. The properties found, render the compounds of the invention suitable for treatment of rheumatic, arthritic and other inflammatory diseases.

As an example of the use of the compounds of the invention, as anti-inflammatory agents, the use of 5-[o-($\alpha$,$\alpha$,$\alpha$-trifluoro-m-toluidino)-benzyl]-tetrazole in the bolus alba induced edema in the rat paw is described. The test used is that described by G. Wilhelmi, Jap. Journ. Pharmac. 15, 190 (1965).

The test compound was administered to rats perorally through an esophageal sound in a dosage of 5 mg/kg of bodyweight. One hour thereafter, bolus alba edema was induced by subcutaneous injection of 0.1 ml of a 10 percent suspension of finely sieved bolus alba in traganth into the plantar region of the right hand paw of the rats. Another group of rats having not obtained the phenylacetic acid derivative, but also the bolus alba, served as control group. Each group consisted of 20 male albino rats weighing about 110 to about 130 g. The intensity of the swelling of the rats' paws was determined 5 hours after the bolus alba injection by measuring the weight differences of the unswollen left paws with the swollen right paws. Comparing the change of swelling of the test group and the control group made it evident that 5-[o-($\alpha,\alpha,\alpha$-trifluoro-m-toluidino)-benzyl]-tetrazole had a significant inhibiting effect on the formation of the bolus alba edema. Administration of from 5 to 200 mg/kg of other compounds of the invention, in particular, of the preferred members of the compounds of the invention, had a similar inhibiting effect.

The same compound administered orally to mice in amounts of about 10 mg/kg showed a considerable analgesic activity in the abovementioned phenylquinone stretch test.

The compounds of the invention have further been found to absorb the irritating rays of ultra-violet light of a wavelength of about 290 to about 315 millimicrons which are primarily responsible for sunburn, while at the same time they do not absorb the desirable so-called "tanning" rays of over 315 millimicrons wavelength. These compounds are, therefore, especially useful as ultra-violet absorbers for cosmetic purposes, e.g. in sun-tan creams or lotions.

The substituted tetrazoles falling under Formula I and their salts with pharmaceutically acceptable bases can be administered orally, rectally or parenterally, in particular intramuscularly. The compounds of the invention can also be used externally in the form of ointments or sun-tan oils.

For their intended pharmaceutical uses, the compounds of the invention are administered in amounts depending on the species, age and weight of the subject under treatment, as well as the particular condition to be treated and the mode of administration.

In general, the daily dosages, to be taken internally, of compounds of formula I or pharmaceutically acceptable salts thereof with a base, for the treatment of rheumatic, arthritic and other inflammatory diseases vary between 25 and 750 mg for adult patients. Suitable dosage units such as dragees, tablets or suppositories, preferably contain 10 to 250 mg of a compound of formula I or a pharmaceutically acceptable salt thereof with a base.

In dosage units for oral administration, the content of active substance is preferably between 10 and 90 percent. Such dosage units are produced by combining the active substance with, e.g. solid, pulverulent carriers such as lactose, saccharose, sorbitol, mannitol; starches such as potato starch, maize starch or amylopectin, also laminaria powder or citrus pulp powder; cellulose derivatives or gelatine, optionally with the addition of lubricants, such as magnesium or calcium stearate or polyethylene glycols, to form tablets or dragee cores. These are coated, for example, with concentrated sugar solutions which can also contain, e.g. gum arabic, talcum and/or titanium dioxide, or with a lacquer dissolved in easily volatile organic solvents or mixtures of solvents. Dyestuffs can be added to these coatings, e.g. to distinguish between varying dosages of active substance. Other suitable dosage units for oral administration are hard gelatine capsules, as well as soft closed capsules made of gelatine and a softener such as glycerin. The hard capsules preferably contain the active substance as a granulate in admixture with lubricants such as talcum or magnesium stearate and, optionally, stabilizers such as sodium metabisulphite ($Na_2SO_5$) or ascorbic acid. In soft capsules, the active substance is preferably dissolved or suspended in suitable liquids such as liquid polyethylene glycols, whereby stabilizers can also be added.

Suitable dosage units for rectal administration are, e.g. suppositories consisting of a combination of an active substance with a suppository foundation substance based on natural and synthetic triglycerides (e.g. cocoa butter), polyethylene glycols or suitable higher fatty alcohols, and gelatine rectal capsules containing a combination of the active substance with polyethylene glycols.

Ampoule solutions for parenteral, especially intramuscular or intravenous administration contain, e.g. a tetrazole derivative of the formula I in a concentration of, preferably, 0.5–5 percent as an aqueous dispersion, prepared with the aid of the usual dissolving agents and/or emulsifiers as well as, optionally, stabilizing agents or an aqueous solution of a pharmaceutically acceptable, water-soluble salt of a tetrazole derivative of formula I.

Further suitable preparations for parenteral administration are, e.g. lotions, tinctures and ointments for percutaneous administration, which are prepared with the usual auxiliary agents.

Sun-tan compositions according to the invention contain a sufficient amount of at least one compound of Formula I or a pharmaceutically acceptable salt thereof with a base, in an amount which absorbs a sufficient amount of ultraviolet radiation having a wavelength in the range of from 290 to 315 millimicrons, as well as a carrier compatible with said compound or salt thereof, which carrier is of creamy to highly fluid consistency.

The following examples will serve to further typify the nature of the present invention, but they should not be construed as a limitation on the scope thereof.

EXAMPLE 1

1.1. 5-[o-($\alpha,\alpha,\alpha$-Trifluoro-m-toluidino)-benzyl]-tetrazole 13.9 g of sodium azide and 11.1 g of ammonium chloride are added to a solution of 41.6 g of $\alpha$-cyano-N-($\alpha,\alpha,\alpha$-trifluoro-m-tolyl)-aceto-o-toluidide in 350 ml of dimethyl formamide. The suspension is refluxed for 16 hours, whereupon the mixture is concentrated by evaporation to dryness at 60° under 0.01 Torr. The residue — a brown oil — is shaken with a mixture from 1,500 ml of cold water and 50 ml of 2N hydrochloric acid. The aqueous phase is decanted and the organic phase dissolved in 1,000 ml of ether. The ether solution is extracted with 200 ml of water, separated, dried over magnesium sulphate and concentrated by evaporation to dryness, whereby the crude N-[o-(5-tetrazolylmethyl)-phenyl]-$\alpha,\alpha,\alpha$-trifluoroaceto-m-toluidide remains.

The above stated crude product is dissolved in 400 ml of ethanol and 70 ml of 2N sodium hydroxide solution and the solution refluxed for 16 hours, cooled and concentrated by evaporation to dryness at 40° under 11

Torr. The residue is dissolved in 300 ml of water, the aqueous solution extracted with 100 ml of ether, separated and acidified with 2N hydrochloric acid. The precipitated oil is dissolved in 300 ml of ether. The ether solution is extracted with 300 ml of 0.1N potassium hydrogen carbonate solution, with 300 ml of 1N potassium hydrogen carbonate solution and with 100 ml of 2N sodium carbonate. The solution carbonate extract is acidified with 2N hydrochloric acid. The precipitated oil is dissolved in 200 ml of ether, the ethereal solution is separated, dried over magnesium sulphate and is then concentrated by evaporation to dryness under 11 Torr. The obtained crude product is crystallized from ethanol/water and then from ether/petroleum ether. The 5-[o-($\alpha,\alpha,\alpha$-trifluoro-m-toluidino)-benzyl]-tetrazole melts at 138°–139°.

EXAMPLE 2

2.1. 5-[o-(2,6-Dichloroanilino)-benzyl]-tetrazole

To a solution of 23.0 g of [o-(2,6-dichloroanilino)-phenyl]-acetonitrile (see below) in 195 ml of absolute dimethyl formamide are added 7.7 g of sodium azide and 6.2 g of ammonium chloride. The mixture is refluxed for 16 hours with a bath temperature of 160°. The mixture is then concentrated by evaporation to dryness at 60° under 0.01 Torr. To the residue are added 100 ml of water and 200 ml of ether. The ether solution is separated and the aqueous solution extracted three times with 200 ml of ether each time. The combined ether solutions are boiled up with active charcoal and filtered. The filtrate is extracted three times with 100 ml of 2N sodium carbonate solution each time. The sodium carbonate extracts are extracted with 50 ml of ether, separated and acidified with 2N hydrochloric acid to obtain pH 4.0. The precipitated crystals are dissolved in 300 ml of ether and any insoluble matter is filtered off. The filtrate is dried over magnesium sulphate and concentrated by evaporation to dryness under 11 Torr. The residue is crystallized from ethyl acetate. The 5-[o-(2,6-dichloroanilino)-benzyl]-tetrazole melts at 186°–188°.

The nitriles required as starting materials are produced as follows:

2.1.a. o-(2,6-dichloroanilino)-benzyl alcohol 30.0 g of lithium aluminum hydride are suspended in 100 ml of absolute ether and, while stirring, cooled to 5°. A solution of 65.0 g of N-(2,6-dichlorophenyl)-anthranilic acid in 500 ml of absolute ether and 100 ml of absolute tetrahydrofuran is slowly added dropwise under nitrogen. The mixture is then refluxed for 15 hours. To the solution cooled to 5° are added dropwise 30 ml of water, 30 ml of 15 percent sodium hydroxide solution and a further 90 ml of water. The reaction mixture is then filtered and the filtrate concentrated by evaporation to dryness at 40° under 11 Torr. The residue is crystallized from ether/petroleum ether. The thus obtained o-(2,6-dichloroanilino)-benzyl alcohol melts at 110°–112°.

2.1.b. $\alpha$-Chloro-N-(2,6-dichlorophenyl)-o-toluidine

A solution of 37.5 g of o-(2,6-dichloroanilino)-benzyl alcohol in 560 ml of absolute ether and 56 ml of absolute pyridine is quickly added dropwise to a solution, cooled to 0°, of 56 ml of thionyl chloride and 56 ml of pentane. The mixture is then stirred for 30 minutes at 0°. Ice is added and the mixture successively extracted with 100 ml of 2N hydrochloric acid, 100 ml of 2N sodium hydroxide solution and 100 ml of water. The organic phase is then filtered to remove insoluble constituents. The filtrate is dried over potassium carbonate and concentrated by evaporation to dryness under 11 Torr. The crude $\alpha$-chloro-N-(2,6-dichlorophenyl)-o-toluidine is directly further reacted.

2.1.c. [o-(2,6-Dichloroanilino)-phenyl]-acetonitrile

A solution of 21.0 g of $\alpha$-chloro-N-(2,6-dichlorophenyl)-o-toluidine in 100 ml of dimethyl sulphoxide is added, while stirring, at 40° to a suspension of 16.0 g of sodium cyanide in 100 ml of dimethyl sulphoxide. The mixture is then stirred for 15 hours at 40° and subsequently diluted with 2,000 ml of ice water. The solution is extracted four times with 1,000 ml of ethyl acetate. The combined ethyl acetate solutions are washed with 200 ml of 6N hydrochloric acid and then with 100 ml of water, dried with magnesium sulphate and concentrated by evaporation under 11 Torr at 40°. The residue is chromatographed on 500 g of neutral aluminum oxide. The fractions 1–3, eluted with ether/petroleum ether (1:1), contain the [o-(2,6-dichloroanilino)-phenyl]-acetonitrile. They are combined and distilled in high vacuum. The nitrile boils at 140°–145°/0.005 Torr and melts, after crystallization from ether/petroleum ether, at 71°–72°.

EXAMPLE 3

The following are produced analogously to Example 2.1.:

3.1. 5-[o-(6-chloro-o-toluidino)-benzyl]-tetrazole, M.P. 189°–192° (from methanol), starting from 22.8 g of [o-(6-chloro-o-toluidino)-phenyl]-acetonitrile, M.P. 73°–74;

3.2. 5-[o-(2,6-xylidino)-benzyl]-tetrazole, M.P. 173°–176° (from ethylacetate/petroleum ether), starting from 48.5 g of [o-(2,6-xylidino)-phenyl]-acetonitrile, M.P. 92°–95°;

3.3 5-[o-(2,6-diethylanilino)-benzyl]-tetrazole, M.P. 196°–198° (from benzene), starting from 12.5 g of [o-(2,6-diethylanilino)-phenyl]-acetonitrile, B.P. 135°/0.01 Torr.

The starting materials are produced analogously to Example 2.1.a. as follows:

3.1.a. o-(6-chloro-o-toluidino)-benzyl alcohol, M.P. 110°–111° (from cyclohexane), is obtained from 13 g of N-(6-chloro-o-tolyl)-anthranilic acid, M.P. 213°–216°;

3.2.a. o-(2,6-xylidino)-benzyl alcohol, M.P. 91°–92° (from ether/petroleum ether), is obtained from 130 g of N-(2,6xylyl)-anthranilic acid, M.P. 205°–208°;

3.3.a. o-(2,6-diethylanilino)-benzyl alcohol, M.P. 88°–89 from ether/petroleum ether), is obtained from 269 g of N-(2,6-diethyl-phenyl)-anthranilic acid, M.P. 176°–178°.

3.1.b. $\alpha$-Chloro-N-(6-chloro-o-tolyl)-o-toluidine

A solution of 19.7 g of o-(6-chloro-o-toluidino)-benzyl alcohol in 600 ml of absolute benzene is slowly heated under nitrogen to reflux temperature. At an internal temperature of about 60°, 2 ml of absolute pyridine are added as well as dropwise while stirring well, a solution of 5.85 ml of thionyl chloride and 50 ml of absolute benzene. The mixture is then refluxed for 30 minutes, cooled and concentrated to dryness at 40° under 11 Torr. The residue is dissolved in 200 ml of ether. The ether phase is extracted with 50 ml of 1 N sodium bicarbonate solution and 50 ml of water, dried over sodium sulphate and concentrated to dryness under 11 Torr. The residue is crystallized from ether/petroleum ether. The α-chloro-N-(6-chloro-o-tolyl)-o-toluidine melts at 89°–91°.

Analogously to Example 3.1.b, the following are obtained:

3.2.b. α-chloro-N-(2,6-xylyl)-o-toluidine, oil, starting from o-(2,6-xylidino)-benzyl alcohol;

3.3.b. α-chloro-N-(2,6-diethylphenyl)-o-toluidine, oil, starting from o-(2,6-diethylanilino)-benzyl alcohol.

Analogously to Example 2.1.c, the following are obtained:

3.1.c. [o-(6-chloro-o-toluidino)-phenyl]-acetonitrile, M.P. 73°–74° (from ether/petroleum ether), starting from 10 g of α-chloro-N-(6-chloro-o-tolyl)-o-toluidine, M.P. 89°–91°;

3.2.c. [o-(2,6-xylidino)-phenyl]-acetonitrile, M.P. 92°–95 (from ether/petroleum ether), starting from 80 g of α-chloro-N-(2,6-xylyl)-o-toluidine, oil;

3.3.c. [o-(2,6-diethylanilino)-phenyl]-acetonitrile, B.P. 135°/0.01 Torr, starting from 20 g of α-chloro-N-(2,6-diethyl-phenyl)-o-toluidine, oil.

EXAMPLE 4

4.1. 5-[o-(N-Methyl-α,α,α-trifluoro-m-toluidino)-benzyl]-tetrazole 2.5 g of sodium azide and 2.0 g of ammonium chloride are added to a solution of 7.0 g of [o-(N-methyl-α,α,α-trifluoro-m-toluidino)-phenyl]-acetonitrile in 80 ml of dimethyl formamide. The suspension is refluxed for 16 hours. The mixture is then concentrated by evaporation to dryness at 60° under 0.01 Torr. The residue is dissolved in 200 ml of ether and the ether solution extracted with 100 ml of 2N sodium carbonate solution and 100 ml of water. The sodium carbonate extract is acidified with 2N hydrochloric acid and the precipitated oil dissolved in 200 ml of ether. The ether solution is separated, washed with 30 ml of water, dried over magnesium sulphate and concentrated by evaporation to dryness under 11 Torr. The residue is crystallized from ether/petroleum ether. The 5-[o-(N-methyl-α,α,α-trifluoro-m-toluidino)-benzyl]-tetrazole melts at 128°–130°.

The nitriles, required as starting materials, are produced as follows:

4.1.a. N-Methyl-N-(α α,α-trifluoro-m-tolyl)-anthranilic acid methyl ester.

54.0 g of a 50 percent sodium hydride dispersion in paraffin oil are added at room temperature to the solution of 159.0 g of N-(α,α,α-trifluoro-m-tolyl)-anthranilic acid in 600 ml of dimethyl formamide. The reaction mixture is heated, while excluding moisture, to 80°. An addition is then made dropwise, while stirring and at room temperature, of 162.0 g of methyl iodide. The mixture is stirred for a further hour at room temperature and then stirred for 17 hours at 70°. The mixture is then poured on to ca. 2,500 ml of ice water. A brown oil precipitates, which is dissolved in 2,500 ml of ether/ethyl acetate (1:1). The ether/ethyl acetate solution is extracted twice using, each time, 250 ml of 2N sodium carbonate solution. It is then washed with 200 ml of water, dried over magnesium sulphate and concentrated by evaporation at 40° under 11 Torr. The obtained N-methyl-N-(α,α,α-trifluoro-m-tolyl)-anthranilic acid methyl ester is fractionally distilled, B.P. 125°/0.01 Torr.

4.1.b. o-(N-Methyl-α,α,α-trifluoro-m-toluidino)-benzyl-alcohol.

10.6 g of sodium boron hydride and 24.25 g of lithium bromide are stirred in 750 ml of diethylene glycol dimethyl ether for 30 minutes at room temperature. A solution of 86.0 g of N-methyl-N-(α,α,α-trifluoro-m-tolyl)-anthranilic acid methyl ester in 490 ml of diethylene glycol dimethyl ether is added dropwise to the obtained suspension. The mixture is subsequently heated for 6 hours to 90°–100°. After cooling, the reaction mixture is stirred into a solution of 89 ml of concentrated hydrochloric acid in 1,300 ml of ice water and, subsequently, the whole is extracted twice with 2,000 ml of ether. The ether solution is washed with diluted sodium hydrogen carbonate solution, dried over sodium sulphate and the solvent distilled off. The residue is fractionally distilled. The o-(N-methyl-α,α,α-trifluoro-m-toluidino)-benzyl alcohol boils at 105°/0.001 Torr.

4.1.c. α-Bromo-N-methyl-N-(α,α,α-trifluoro-m-tolyl)-o-toluidino 216 ml of phosphorus tribromide are added dropwise at 0°–10° to a solution of 44.0 g of o-(N-methyl)-α,α,α-trifluoro-m-toluidino)-benzyl alcohol in 100 ml of absolute benzene. The mixture is then stirred for 20 hours at room temperature and poured on to ca. 3,000 ml of ice water. The precipitated oil is dissolved in 2,000 ml of ether. The ether solution is washed with 400 ml of 1N potassium hydrogen carbonate solution and 200 ml of sodium chloride solution, dried over magnesium sulphate and concentrated by evaporation at 40° under 11 Torr. The α-bromo-N-methyl-N-(α,α,α-trifluoro-m-tolyl)-o-toluidine remains as yellow oil.

4.1.d. [o-(N-Methyl-α,α,α-trifluoro-m-toluidino)-phenyl]-acetonitrile.

A solution from 20.0 g of sodium cyanide in 400 ml of absolute dimethyl sulphoxide is slowly added to a solution of 100.0 g of α-bromo-N-methyl-N-(α,α,α-trifluoro-m-tolyl)-o-toluidine in 300 ml of absolute dimethyl sulphoxide, whereby the temperature of the solution must not exceed 40°. The mixture is subsequently stirred for 20 hours at 40°, cooled and poured on to 3,500 ml of ice water. The aqueous mixture is extracted three times using, each time, 2,000 ml of ethyl acetate. The ethyl acetate extracts are washed with 200 ml of 6N hydrochloric acid and 300 ml of water. The ethyl acetate extracts are then combined, dried over magnesium sulphate and concentrated by evaporation to dryness at 40° under 11 Torr. The [o-(N-methyl-α,α,α-trifluoro-m-toluidino)-phenyl]-acetonitrile remains as yellow oil.

EXAMPLE 5

5.1. Lithium salt of the 5-[o-(α,α,α-Trifluoro-m-toluidino)-benzyl]-tetrazole.

4.0 g of 5-[o-(α,α,α-trifluoro-m-toluidino)-benzyl]-tetrazole are dissolved in 12.5 ml of 1N lithium hydroxide. The pH of this solution is 7.0. The solution is extracted with 10 ml of ether and subsequently concentrated by evaporation to dryness under 11 Torr at 50°. Twenty ml of benzene are added three times to the residue and the mixture is concentrated each time by evaporation to dryness under 11 Torr. The final residue is dissolved in 100 ml of ether, the ether solution is filtered and is concentrated by evaporation to dryness under 11 Torr. The residue of the ether solution is crystallized from ethyl acetate. The thus obtained lithium salt of the 5-[o-($\alpha,\alpha,\alpha$-trifluoro-m-toluidino)-benzyl]-tetrazole melts at 200°–202°.

5.2. Lithium salt of 5-[o-(3-Chloro-o-toluidino)-benzyl]-tetrazole 3.0 g of 5-[o-(3-chloro-o-toluidino)-benzyl]-tetrazole are dissolved in 10.0 ml of 1 N lithium hydroxide. The solution is extracted with 10 ml of ether and then evaporated to dryness at 50° under 11 Torr. The residue is treated with 30 ml of absolute benzene and evaporated to dryness under 11 Torr. The residue is dissolved in ethyl acetate. The ethyl acetate solution is filtered and concentrated under 11 Torr. Upon addition of petroleum ether, the lithium salt of 5-[o-(3-chloro-o-toludino)-benzyl]-tetrazole crystallizes, M.P. 225°–230°.

EXAMPLE 6

The following are produced analogously to Example 4.1.:

6.1. 5-[o-(N-n-butyl-$\alpha,\alpha,\alpha$-trifluoro-m-toluidino)-benzyl]-tetrazole, M.P. 92°–93°, starting from [o-(N-n-butyl-$\alpha,\alpha,\alpha$-trifluoro-m-toluidino)-phenyl]-acetonitrile;

6.2. 5-[o-(N-ethyl-$\alpha,\alpha,\alpha$-trifluoro-m-toluidino)-benzyl]-tetrazole, M.P. 140°–142°, from [o-(N-ethyl-$\alpha,\alpha,\alpha$-trifluoro-m-toluidino)-phenyl]-acetonitrile;

6.3. 5-[o-(N-ethyl-3-chloro-o-toluidino)-benzyl]-tetrazole, M.P. 159°–161°, starting from [o-(N-ethyl-3-chloro-o-toluidino)-phenyl]-acetonitrile.

The starting materials are produced as follows:

6.1.a. N-(n-butyl)-N-($\alpha,\alpha,\alpha$-trifluoro-m-tolyl)-anthranilic acid -methyl ester 41.5 g of sodium hydride dispersion in mineral oil (50 percent) are added in portions at room temperature to a solution of 255 g of N-($\alpha,\alpha,\alpha$-trifluoro-m-tolyl)-anthranilic acid-methyl ester in 1,500 ml of absolute dimethyl formamide. The reaction mixture is heated for 1 hour at 80° with the exclusion of moisture. Then, at an inner temperature of 20°, 119 g of n-butyl bromide is added dropwise with stirring. The mixture is then heated to 50° for 3 hours, cooled and poured onto 7,000 ml of ice water. The oil which precipitates is extracted with 3,000 ml of ether. The ethereal solution is separated, washed with 800 ml of water as well as with 800 ml of saturated sodium chloride solution, dried over sodium sulphate, and evaporated to dryness under 11 Torr. The residual N-(n-butyl)-N-($\alpha,\alpha,\alpha$-trifluoro-m-tolyl)-anthranilic acid-methyl ester is fractionally distilled with a Vigreux column, B.P. 117°–119°/0.01 Torr.

The following are obtained analogously to Example 6.1.a.:

6.2.a. N-ethyl-N-($\alpha,\alpha,\alpha$-trifluoro-m-tolyl)-anthranilic acid-methyl ester from N-($\alpha,\alpha,\alpha$-trifluoro-m-tolyl)-anthranilic acid-methyl ester;

6.3.a. N-ethyl-N-(3-chloro-o-tolyl)-anthranilic acid-methyl ester from N-(3-chloro-o-tolyl)-anthanilic acid-methyl ester.

6.1.b. o-[N-(n-Butyl)-$\alpha,\alpha,\alpha$-trifluoro-m-toluidino]-benzyl alcohol 624 ml of a 0.43 molar solution of lithium aluminum hydride in ether is added dropwise at 5° under nitrogen to a solution of 189.0 g of N-(n-butyl)-N-($\alpha,\alpha,\alpha$-trifluoro-m-tolyl)-anthranilic acid-methyl ester in 3,000 ml of absolute benzene. The reaction mixture is stirred for 16 hours at 5° under nitrogen. The mixture is then treated dropwise with 16.5 ml of water, 16.5 ml of 15 percent sodium hydroxide solution and again 50 ml of water. The reaction mixture is then filtered and the filtrate is evaporated to dryness at 40° under 11 Torr. The residue is chromatographed on 2,400 g of neutral aluminum oxide. The fractions 1–5, eluted with 1,000 ml each of ether, are combined and evaporated to dryness under 11 Torr. The residue, an oil, is chromatographed on 2,400 g of silica gel. The fractions 7–14, eluted with 1,000 ml each of ether/petroleum ether (4:6), are combined and distilled. The o-[N-(n-butyl)-$\alpha,\alpha,\alpha$-trifluoro-m-toluidino]-benzyl alcohol boils at 126°–130°/0.005 Torr.

The following are produced analogously to Example 6.1.b.:

6.2.b. o-(N-ethyl-$\alpha,\alpha,\alpha$-trifluoro-m-toluidino)-benzyl alcohol, B.P. 120°/0.001 Torr, is obtained from 90 g of N-ethyl-N-($\alpha,\alpha,\alpha$-trifluoro-m-tolyl)-anthranilic acid-ethyl ester, B.P. 126°/0.01 Torr.

6.3.b. o-(N-ethyl-3-chloro-o-toluidino)-benzyl alcohol, B.P. 138°–140°/0.001 Torr, M.P. 66°–68° (from ether/petroleum ether), is obtained using 31.8 g of N-ethyl-N-(3-chloro-o-tolyl)-anthranilic acid-ethyl ester, B.P. 134°–136°/0.001 Torr.

The following are produced analogously to Example 4.1.c.:

6.1.c. $\alpha$-bromo-N-(n-butyl)-N-($\alpha,\alpha,\alpha$-trifluoro-m-tolyl)-o-toluidine from o-[N-(n-butyl)-$\alpha,\alpha,\alpha$-trifluoro-m-toluidino]-benzyl alcohol, B.P. 126°–130°/0.005 Torr;

6.2.c. $\alpha$-bromo-N-ethyl-N-($\alpha,\alpha,\alpha$-trifluoro-m-tolyl)-o-toluidine from o-(N-ethyl-$\alpha,\alpha,\alpha$-trifluoro-m-toluidino)-benzyl alcohol, B.P. 120°/0.001 Torr;

6.3.c. $\alpha$-bromo-N-ethyl-N-(3-chloro-o-tolyl)-o-toluidine from o-(N-ethyl-3-chloro-o-toluidino)-benzyl alcohol, B.P. 136°–140°/0.001 Torr.

The following are produced analogously to Example 4.1.d.:

6.1.d. [o-(N-butyl-$\alpha,\alpha,\alpha$-trifluoro-m-toluidino)-phenyl]-acetonitrile, B.P. 126°–130°/0.005 Torr from $\alpha$-bromo-N-(n-butyl)-N-($\alpha,\alpha,\alpha$-trifluoro-m-tolyl)-o-toluidine;

6.2.d. [o-(N-ethyl-$\alpha,\alpha,\alpha$-trifluoro-m-toluidino)-phenyl]-acetonitrile, B.P. 134°–135°/0.01 Torr from $\alpha$-bromo-N-ethyl-N-($\alpha,\alpha,\alpha$-trifluoro-m-tolyl)-o-toluidine;

6.3.d. [o-(N-ethyl-3-chloro-o-toluidino)-phenyl]-acetonitrile, M.P. 96°–97° (from ethanol), from $\alpha$-bromo-N-ethyl-N-(3-chloro-o-tolyl)-o-toluidine.

EXAMPLE 7

7.1. 5-[o-(3-Chloro-o-toluidino)-benzyl]-tetrazole

A solution of 2.3 g of 5-[N-formyl-o-(3-chloro-o-toluidino)-benzyl]-tetrazole in 50 ml of 7 percent ethanolic potassium hydroxide solution is refluxed for 3 hours, cooled and evaporated to dryness at 40° under 11 Torr. The residue is dissolved in 150 ml of water. The aqueous solution is extracted with 50 ml of either, separated and acidified with 2 N hydrochloric acid. The oil which precipitates is extracted with 100 ml of ether. The ethereal solution is extracted with 20 ml of water, dried over sodium sulphate and concentrated to dryness under 11 Torr. The residue is crystallized from ether/petroleum ether. The 5-[o-(3-chloro-o-toluidion)-benzyl]-tetrazole melts at 153°–155°.

7.2. Analogously to Example 7.1., 5-[o-(2,3-xylidino)-benzyl]-tetrazole, M.P. 169°–171° (from ether/petroleum ether), is produced from 2.0 g of 5-[N-formyl-o-(2,3-xylidino)-benzyl]-tetrazole.

The starting materials are obtained as follows:

7.1.a. o-(3-Chloro-o-toluidino)-benzyl alcohol 18.15 g of lithium aluminum hydride are suspended in 200 ml of absolute tetrahydrofuran and, with stirring, cooled to 5°. Under nitrogen, a solution of 50.0 g of N-(3-chloro-o-tolyl)-anthranilic acid in 200 ml of absolute tetrahydrofuran is slowly added dropwise. The mixture is then refluxed for 2 hours, cooled to 5° and treated dropwise with 18.2 ml of water, 18.2 ml of 15 percent sodium hydroxide solution and again with 54.5 ml of water. The reaction mixture is then filtered and the filtrate is evaporated to dryness at 40° under 11 Torr. The residue is dissolved in 400 ml of ether. The ethereal solution is washed with 50 ml of water, 150 ml of 2 N sodium carbonate solution and 50 ml of water, dried over sodium sulphate and evaporated at 40° under 11 Torr. The residue is distilled under high vacuum. The o-(3-chloro-o-toluidino)-benzyl alcohol boils at 160°/0.01 Torr, M.P. 51°–52° (from ether/petroleum ether).

7.2.a. Analogously to Example 7.1.a., o-(2,3-xylidino)-benzyl alcohol, M.P. 74°–75° (from ether/petroleum ether), is produced from 250 g of N-(2,3-xylyl)-anthranilic acid.

7.1.b. α-Chloro-N-(3-chloro-o-tolyl)-o-toluidine

One hundred ml of 5 N ethereal hydrochloric acid are added to a solution of 6.0 g of o-(3-chloro-o-toluidino)-benzyl alcohol in 50 ml of absolute ether. The mixture is shaken for 5 minutes, whereby the precipitated crystals dissolve. After adding 200 ml more of absolute ether, the solution is shaken for 15 minutes and concentrated at 40° under 11 Torr. The residue is treated with a little ether/petroleum ether (1:1). The crystals which precipitate are filtered and treated with 30 ml of water as well as 200 ml of ether. The mixture is shaken and the ethereal solution is separated, washed with 30 ml of water, dried over sodium sulphate and concentrated under 11 Torr. The α-chloro-N-(3-chloro-o-tolyl)-o-toluidine which is still moist with ether is immediately further reacted.

7.2.b. Analogously to Example 7.1.b. α-chloro-N-(2,3-xylyl)-o-toluidine is obtained from 15 g of o-(2,3-xylidino)-benzyl alcohol.

7.1.c. [o-(3-Chloro-o-toluidino)-phenyl]-acetonitrile

A solution of 5.5 g of crude α-chloro-N-(3-chloro-o-tolyl)-o-toluidine in 20 ml of dimethyl sulphoxide is added at 40° with stirring to a suspension of 1.3 g of sodium cyanide in 80 ml of dimethyl sulphoxide. The mixture is stirred at 40° for 90 minutes and diluted with 800 ml of ice water. The solution is extracted three times with 400 ml of ethyl acetate each time. The ethyl acetate solutions are each washed with 100 ml of water and 100 ml of saturated sodium chloride solution, dried over sodium sulphate and evaporated at 40° under 11 Torr. The residue is dissolved in 50 ml of ether. The ether solution is filtered through a layer of neutral aluminum oxide. The filtrate is evaporated to dryness under 11 Torr. The residue is crystallized from ether/petroleum ether. The [o-(3-chloro-o-toluidino)-phenyl]-acetonitrile melts at 86°–88°.

7.2.c. Analogously to Example 7.1.c., [-(2,3-xylidino)-phenyl]-acetonitrile, M.P. 95°–96° (from ether/petroleum ether), is obtained from 9 g of α-chloro-N-(2,3-xylyl)-o-toluidine.

7.1.d. α-Cyano-N-(3-chloro-o-tolyl)-o-formotoluidide

A mixture of 8.5 ml of formic acid and 17.5 ml of acetic anhydride is stirred for 1 hour at 40°–50°. Then 2.4 g of [o-(3-chloro-o-toluidino)-phenyl]-acetonitrile are added in portions thereto and the mixture is stirred for 6 hours at 40°. The solution is then poured with stirring, into 100 ml of warm water (40°), stirred for 20 minutes and the mixture is poured onto ice. The oil which precipitates is extracted with ether. The ethereal solution is separated, washed with water, dried over sodium sulphate and filtered through a layer of neutral aluminum oxide. The filtrate is evaporated to dryness under 11 Torr. The residue is crystallized from ether/petroleum ether. The α-cyano-N-(3-chloro-o-tolyl)-o-formotoluidide melts at 114°–116°.

7.2.d. Analogously to Example 7.1.d., α-cyano-N-(2,3-xylyl)-o-formotoluidide, M.P. 119°–121° (from ether/petroleum ether), is obtained from 6.0 g of [o-(2,3-xylidino)-phenyl]-acetonitrile.

7.1.e. 5-[N-Formyl-o-(3-chloro-o-toluidino)-benzyl]-tetrazole 1.92 g of sodium azide and 1.54 g of ammonium chloride are added to a solution of 5.9 g of α-cyano-N-(3-chloro-o-tolyl)-o-formotoluidide in 60 ml of dimethyl formamide. The suspension is refluxed for 36 hours. Then the mixture is evaporated to dryness at 60° under 0.01 Torr. The residue is treated with 100 ml of ice water and 20 ml of 2 N sodium carbonate solution. The alkaline aqueous solution is extracted with 30 ml of ether, acidified with 2 N hydrochloric acid, and the oil which precipitates is extracted with ether. The ethereal solution is washed with water, dried over sodium sulphate and evaporated under 11 Torr. The 5-[N-formyl-o-(3-chloro-o-toluidino)-benzyl]-tetrazole crystallizes from ethyl acetate/ether, M.P. 175°–176°.

7.2.e. 5-[N-Formyl-o-(2,3-xylidino)-benzyl]-tetrazole

A mixture of 3.38 g of sodium azide and 2.28 g of aluminum chloride in 22 ml of absolute tetrahydrofuran is refluxed for 30 minutes. To the cooled mixture, a solution of 4.0 g of α-cyano-N-(2,3-xylyl)-o-formotoluidide in 8 ml of absolute tetrahydrofuran is added. The mixture is then stirred for 3 days at reflux, cooled, diluted with 50 ml of ice water, and evaporated at 60° under 11 Torr. The residue is treated with 20 ml of 2 N hydrochloric acid, and the mixture is extracted with 60 ml of chloroform. The chloroform solution is extracted with 20 ml of 2 N sodium hydroxide solution. The alkaline aqueous solution is separated, treated with active charcoal and filtered. The filtrate is acidified with concentrated hydrochloric acid. The crystals which precipitate are extracted with ether. The ethereal solution is dried over sodium sulphate and evaporated under 11 Torr. The residue is crystallized from ethyl acetate/ether. The 5-[N-formyl-o-(2,3-xylidino)-benzyl)]-tetrazole melts at 188°–191°.

EXAMPLE 8

8.1. Analogously to Example 7.1., 5-(o-anilino-benzyl)-tetrazole, M.P. 141°–142° (from benzene), is obtained from 5-(N-formyl-o-anilino-benzyl)-tetrazole.

8.1.a. Formic acid-o-(N-phenyl-formamido)-benzyl ester

A mixture of 63 ml of formic acid and 130 ml of acetic anhydride is stirred for one hour at 40°. The 19.9 g of o-anilino-benzyl alcohol are added in portions thereto and the mixture is stirred for 3 hours at 40° and for 16 hours at room temperature. The solution is then poured with stirring into 1,000 ml of warm water (40°), stirred for 20 minutes and cooled to room temperature. The oil which precipitates is extracted with ether. The ether solution is washed three times with water, dried over sodium sulphate and evaporated to dryness under 11 Torr. The residue is distilled in a bulb tube. The formic acid-o-(N-phenyl-formamido)-benzyl ester boils at 135°–140°/0.001 Torr.

8.1.b. α-Hydroxy-N-phenyl-o-formotoluidide

A solution of 19.4 g of formic acid-o-(N-phenyl-formamido)-benzyl ester and 300 ml of ethanol are added dropwise with stirring at room temperature to a solution of 8.08 g of sodium carbonate and 100 ml of water. The mixture is stirred for 5 hours at room temperature and poured onto 3,000 ml of ice water. The oil which precipitates is extracted with ether. The ethereal solution is washed with water, dried over sodium sulphate and evaporated under 11 Torr. The residue is chromatographed on 800 g of silica gel. The fractions 6–9, eluted with 1,000 ml of ether each, contain the pure α-hydroxy-N-phenyl-o-formotoluidide as yellow oil.

8.1.c. α-Chloro-N-phenyl-o-formotoluidide

A solution of 9.9 g of α-hydroxy-N-phenyl-o-formotoluidide in 334 ml of absolute benzene is slowly heated under nitrogen. At about 50° interior temperature, 0.31 ml of pyridine are added and dropwise also a solution of 5.65 ml of thionyl chloride and 28 ml of absolute benzene. Then the mixture is stirred for 30 minutes at 50° and evaporated to dryness at 40° under 11 Torr. The residue is dissolved in 100 ml of ether. The ethereal solution is extracted with 40 ml of water and 40 ml of saturated sodium chloride solution, dried over sodium sulphate and concentrated under 11 Torr to a volume of about 30 ml The ethereal solution of α-chloro-N-phenyl-o-formotoluidide is immediately further reacted.

8.1.d. α-Cyano-N-phenyl-o-formotoluidide

A solution of about 10.0 g of crude α-chloro-N-phenyl-o-formotoluidide in 30 ml of ether is added at room temperature with stirring to a solution of 3.06 g of sodium cyanide in 197 ml of dimethyl sulphoxide. The mixture is then stirred for 10 minutes at room temperature and poured onto 1,000 ml of ice water. The yellow oil which precipitates is extracted with 800 ml of ethyl acetate. The ethyl acetate solution is washed with 200 ml of water and 200 ml of saturated sodium chloride solution and evaporated to dryness at 40° under 11 Torr. The α-cyano-N-phenyl-o-formotoluidide is an oil.

8.1.e. Analogously to Example 7.1.e., 5-[N-formyl-o-anilino-benzyl]-tetrazole, M.P. 159°–160° (from ethyl acetate), is obtained from 4.5 g of α-cyano-N-phenyl-o-formotoluidide.

EXAMPLE 9

9.1. 5-[o-(3-Chloro-o-toluidino)-benzyl]-tetrazole

A mixture of 1.91 g of sodium azide and 1.3 g of aluminum chloride in 20 ml of absolute tetrahydrofuran is refluxed for 30 minutes. After cooling the solution, a solution of 2.2 g of [o-(3-chloro-o-toluidino)-phenyl]-acetonitrile in 20 ml of absolute tetrahydrofuran is added thereto. The mixture is then refluxed for 3 days, cooled, diluted with 50 ml of ice water, and concentrated under 11 Torr at 60° to a volume of about 30 ml. The aqueous mixture is treated with 20 ml of 2 N hydrochloric acid, and extracted with 100 ml of chloroform. The chloroform solution is separated and extracted with water and then with 20 ml of 2 N sodium hydroxide solution. The alkaline aqueous solution is separated, treated with active charcoal and filtered. The filtrate is acidified with concentrated hydrochloric acid. The precipitated crystals are extracted with ether. The ethereal solution is dried over sodium sulphate, and evaporated to dryness under 11 Torr. The residue is crystallized from ether/petroleum ether. The 5-[o-(3-chloro-o-toluidino)-benzyl]-tetrazole melts at 153°–155°.

9.2. Analogously to Example 9.1., 5-[-o-(2,6-dichloroanilino)-benzyl]-tetrazole, M.P. 186°–188° (from ethyl acetate), is obtained from 4.5 g of [o-(2,6-dichloroanilino)-phenyl]-acetonitrile, M.P. 71°–72°.

EXAMPLE 10

10.1. 5-[o-(N-n-Propyl-α,α,α-trifluoro-m-toluidino)-benzyl]-tetrazole

A solution of 6.4 g of 5-[o-(α,α,α-trifluoro-m-toluidino)-benzyl]-tetrazole (M.P. 128°–130°) in 27 ml of absolute dimethyl formamide are added dropwise at 0°–5° to a suspension of 1.92 g of a 50 percent sodium hydride dispersion (in mineral oil) in 27 ml of absolute dimethyl formamide. The suspension is stirred for 20 minutes at room temperature. Then at 0° a solution of 2.46 g of n-propyl bromide in 20 ml of dimethyl formamide is added dropwise thereto. The mixture is then stirred for 2 hours at room temperature and evaporated to dryness at 60° under 11 Torr. The residue is dissolved in 150 ml of water. The aqueous solution is extracted with 50 ml of ether, separated and acidified with concentrated hydrochloric acid. The oil which precipitates is dissolved in 200 ml of ether. The ethereal solution is washed with water, dried over sodium sulphate and evaporated to dryness under 11 Torr. The residue is crystallized from ether. The 5-[o-(N-n-propyl-α,α,α-trifluoro-m-toluidino)-benzyl]-tetrazole melts at 132°–134°.

10.2. Analogously to Example 10.1., 5-[o-(N-ethyl-α,α,α-trifluoro-m-toluidino)-benzyl]-tetrazole, M.P. 140°–142°, is obtained from 6.7 g of 5-[o-(α,α,α-trifluoro-m-toluidino)-benzyl]-tetrazole.

10.3. Analogously to Example 10.1., 5-[o-(N-ethyl-3-chloro-o-toluidino)-benzyl]-tetrazole, M.P. 159°–161°, is obtained from 7.3 g of 5-[o-(3-chloro-o-toluidino)-benzyl]-tetrazole.

The following prescriptions further illustrate the production of pharmaceutical compositions:

EXAMPLE 11

Two hundred and fifty g of active substance, e.g. 5-[o-(3-chloro-o-toluidino)-benzyl]-tetrazole, are mixed with 550 g of lactose and 292 g of potato starch. The mixture is moistened with an alcoholic solution of 8 g of gelatine and is then granulated through a sieve. After drying, 60 g of potato starch, 60 g of talcum and 10 g of magnesium stearate and 20 g of highly dispersed silicon dioxide are mixed in and the mixture is pressed into 10,000 tablets each weighing 125 mg and each containing 25 mg of active substance. Optionally, the tablets can be provided with grooves for more accurate adjustment of the dosage amount.

EXAMPLE 12

Twenty g of active substance, e.g. 5-[o-(3-chloro-o-toluidino)-benzyl]-tetrazole, are well mixed with 16 g of maize starch and 6 g of highly dispersed silicon dioxide. The mixture is moistened with a solution of 2 g of stearic acid, 6 g of ethyl cellulose and 6 g of stearin in ca. 70 ml of isopropyl alcohol and is granulated through a sieve III (Ph.Helv.V). The granulate is dried for ca. 14 hours and is then put through sieve III–IIIa. It is then mixed with 16 g of maize starch, 16 g of talcum and 2 g of magnesium stearate and the mixture is pressed into 1,000 dragee cores. These are coated with a concentrated syrup made from 2 g of shellac, 7.5 g of gum arabic, 0.15 g of dyestuff, 2 g of highly dispersed silicon dioxide, 25 g of talcum and 53.35 g of sugar, and dried. The obtained dragees each weigh 180 mg and each contain 20 mg of active substance.

EXAMPLE 13

Twenty-five g of 5-[o-(3-chloro-o-toluidino)-benzyl]-tetrazole are dissolved in a mixture of 187 ml of 1N sodium hydroxide solution and 500 ml of thoroughly boiled, pyrogen-free water. The solution is made up to 2,000 ml with water treated in a like manner, whereupon, it is filtered and used to fill 1,000 ampoules each containing 2 ml, and sterilized. A 2 ml ampoule contains 25 mg of the tetrazole as active substance in the form of the sodium salt.

EXAMPLE 14

Fifty g of 5-[o-(3-chloro-o-toluidino)-benzyl]-tetrazole and 1,950 g of a finely ground suppository base substance (e.g. cocoa butter) are thoroughly mixed and then melted. From the melt, maintained homogeneous by stirring, are obtained 1,000 suppositories, each weighing 2 g and each containing 50 mg of active substance.

EXAMPLE 15

Sixty g of polyoxyethylene sorbitan monostearate, 30 g of sorbitan monostearate, 150 g of paraffin oil and 120 g of stearyl alcohol are melted together. Fifty g of 5-[o-(3-chloro-o-toluidino)-benzyl]-tetrazole are added and 590 ml of water, preheated to 40°, are added to form an emulsion. The emulsion is stirred until it has cooled to room temperature and is then filled into tubes.

One of the following prescriptions can be used for the production of sun-tan creams:

EXAMPLE 16

| | |
|---|---|
| 5-[o-(2,6-dichloro-anilino)-benzyl]-tetrazole | 1.0 g |
| paraffin oil, thinly liquid | 1.0 g |
| polyoxyethylene sorbitan monostearate | 2.0 g |
| polyoxyethylene sorbitol lanoline derivative | 1.5 g |
| sorbitol solution 70% | 3.0 g |
| stearic acid | 15.0 g |
| preservative + perfume | q.s. |
| water | ad 100.0 g |

EXAMPLE 17

| | |
|---|---|
| 5-[o-(2,6-dichloro-anilino)-benzyl]-tetrazole | 1.0 g |
| propylene glycol | 28.0 g |
| glycerine monostearate | 18.0 g |
| polyoxyethylene-sorbitan monolaurate | 8.0 g |
| thimerosal (solution 1:1000) | 1.0 g |
| perfume | q.s. |
| water | ad 100.0 g |

EXAMPLE 18

| | |
|---|---|
| 5-[o-(3-chloro-o-toluidino)-benzyl]-tetrazole | 1.0 g |
| paraffin oil (thin liquid) | 1.0 g |
| polyoxyethylene-sorbitan monostearate | 2.0 g |
| polyoxyethylene-sorbitol-lanolin derivative | 1.5 g |
| sorbitol solution 70% | 3.0 g |
| stearic acid | 15.0 g |
| preservative + perfume | q.s. |
| water | ad 100.0 g |

EXAMPLE 19

| | |
|---|---|
| 5-[o-(N-ethyl-3-chloro-o-toluidino)-benzyl]-tetrazole | 1.0 g |
| propylene glycol | 28.0 g |
| glycerine monostearate | 18.0 g |
| polyoxyethylene-sorbitan monolaurate | 8.0 g |
| thimerosal (solution 1:1000) | 1.0 g |
| perfume | q.s. |
| water | ad 100.0 g |

What we claim is:

1. A compound of the formula

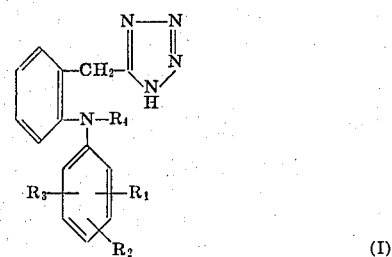

wherein
$R_1$ and $R_3$ independently of each other, are hydrogen, methyl, ethyl or halogen up to the atomic number 35;
$R_2$ is hydrogen, methyl, ethyl, trifluoromethyl or halogen up to the atomic number 35; and
$R_4$ is hydrogen, methyl, ethyl, n-propyl or n-butyl;
and the pharmaceutically acceptable salts thereof with bases.

2. A compound according to claim 1, wherein
$R_1$ is in 2-position and is hydrogen, methyl or chloro,
$R_2$ is in 3-position and is hydrogen, methyl, trifluoromethyl or chloro,
$R_3$ is in 6-position and is hydrogen or chloro,
$R_4$ is hydrogen, methyl or ethyl,
and the pharmaceutically acceptable salts thereof with bases.

3. A compound according to claim 1, which is 5-[o-(3-chloro-o-toluidino)-benzyl]-tetrazole.

4. A compound according to claim 1, which is 5-[o-(N-ethyl‑3-chloro-o-toluidino)-benzyl]-tetrazole.

5. A compound according to claim 1, which is 5-[o-($\alpha,\alpha,\alpha$-trifluoro-m-toluidino)-benzyl]-tetrazole and the lithium salt thereof.

6. A compound according to claim 1, which is 5-[o-(N-methyl-$\alpha,\alpha,\alpha$-trifluoro-m-toluidino)-benzyl]-tetrazole.

7. A compound according to claim 1, which is 5-[o-(N-ethyl-$\alpha,\alpha,\alpha$-trifluoro-m-toluidino)-benzyl]-tetrazole.

8. A compound according to claim 1, which is 5-[o-(2,3-xylidino)-benzyl]-tetrazole.

9. A compound according to claim 1, which is 5-[o-(2,6-dichloro-anilino)-benzyl]-tetrazole.

* * * * *